(12) United States Patent
Lagace et al.

(10) Patent No.: US 7,264,404 B2
(45) Date of Patent: Sep. 4, 2007

(54) OPTICAL CONNECTOR ASSEMBLY

(75) Inventors: Michael Lagace, Haddam, CT (US);
John Grunbeck, Northford, CT (US);
Milton E. Ives, Jr., Bolton, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 336 days.

(21) Appl. No.: 11/014,620

(22) Filed: Dec. 16, 2004

(65) Prior Publication Data

US 2006/0093275 A1  May 4, 2006

(30) Foreign Application Priority Data

Oct. 29, 2004  (CA) .................................... 2486320
Nov. 1, 2004   (GB) ................................ 0424108.9

(51) Int. Cl.
*G02B 6/38* (2006.01)
(52) U.S. Cl. ............................ 385/70; 385/55; 385/71; 385/72; 385/73; 385/136; 385/137
(58) Field of Classification Search ................ 385/70, 385/71, 72, 73, 55, 136, 137
See application file for complete search history.

(56) References Cited

U.S. PATENT DOCUMENTS

| | | | |
|---|---|---|---|
| 4,113,346 A | | 9/1978 | Jackson et al. |
| 4,274,708 A | * | 6/1981 | Cocito et al. ................ 385/95 |
| 4,915,467 A | | 4/1990 | Berkey |
| 4,915,472 A | | 4/1990 | Liu |
| 4,927,229 A | * | 5/1990 | Tanaka et al. ............... 385/70 |
| 4,955,976 A | | 9/1990 | Freeman et al. |

(Continued)

FOREIGN PATENT DOCUMENTS

DE          3433039         3/1986

(Continued)

OTHER PUBLICATIONS

U.K. Search Report, Application No. GB0424108.9, dated Jan. 6, 2005.

*Primary Examiner*—Frank G. Font
*Assistant Examiner*—James P. Hughes
(74) *Attorney, Agent, or Firm*—Patterson & Sheridan, LLP

(57) ABSTRACT

Optical connector assemblies suitable for use in harsh environments such as down hole oil and gas well applications and methods for fabricating the same are provided. In one embodiment, an optical connector assembly suitable for down hole oil field applications comprises a first and second optical waveguide urged by a biasing member against a bracket. Each of the waveguides has at least one base surface formed on the exterior of the waveguide that is disposed against at least one of a plurality of reference surfaces of the bracket. In another embodiment, flats comprise two of the base surfaces on each optical waveguide. In another embodiment, a method of fabricating an optical connector assembly suitable for down hole oil field applications includes the steps of forming a first flat on a first optical waveguide, forming a second flat on the first optical waveguide, forming a first flat on a second optical waveguide, forming a second flat on the second optical waveguide, and biasing the first flats of the first and second optical waveguides against a first seating surface and second flats of the first and second optical waveguides against a second seating surface.

28 Claims, 9 Drawing Sheets

U.S. PATENT DOCUMENTS

| | | |
|---|---|---|
| 5,631,989 A * | 5/1997 | Koren et al. .................. 385/91 |
| 5,745,626 A | 4/1998 | Duck et al. |
| 6,422,084 B1 | 7/2002 | Fernald et al. |
| 6,519,388 B1 | 2/2003 | Fernald et al. |

FOREIGN PATENT DOCUMENTS

| | | |
|---|---|---|
| JP | 62-226107 | 10/1987 |
| JP | 5-88041 | 4/1993 |

* cited by examiner

OPTICAL CONNECTOR ASSEMBLY

CROSS-REFERENCE TO RELATED APPLICATIONS

This application claims priority to Canadian patent application number 2,486,320 filed Oct. 29, 2004 and UK patent application number 0424108.9, filed on Nov. 1, 2004, which are both herein incorporated by reference.

BACKGROUND OF THE INVENTION

1. Field of the Invention

Embodiments of the invention generally relate to an optical connector assembly and method of fabricating the same, suitable for use in harsh environments such as down hole gas and oil well applications.

2. Background of the Related Art

Transmitting information, such as temperature, strain and seismic movement, through optical fibers utilized in down hole gas and oil (e.g., petroleum) field drilling applications is becoming more widely accepted as gas and oil field producers embrace the advantages of optical fiber systems over conventional metallic conductors. For example, optical fiber sensing systems exhibit increased long-term reliability over conventional conductors, often having a useful service life up to and exceeding four times the service life of conventional sensing systems utilizing metallic conductors, thus allowing efficient petroleum removal to continue long into the life of wells utilizing optical sensing systems, and thereby maximizing the profitability of older wells.

However, as optical fiber sensing systems for oil and gas well use become more widespread, it has become apparent that conventional optical equipment commonly utilized in above-ground telephone and data transmission is not compatible with the harsh environmental conditions present in down hole oil and gas well applications. For example, optical connector assemblies utilized in down hole sensing applications must be able to operate reliably in conditions that may include temperatures in excess of 300 degrees Celsius, static pressures in excess of 20,000 pounds per square inch (psi), vibration, corrosive chemistry and the presence of high partial pressures of hydrogen. Experience has demonstrated that conventional optical connector assemblies that utilize ceramic ferrules fastened to optical fiber by epoxy do not provide reliable and robust coupling of optical fibers at the elevated temperatures present in down hole well environments. Particularly, the mismatch in the thermal coefficient of expansion between the epoxy, the ceramic ferrules and the optical fiber results in movement and misalignment of the mating optical fibers in the connector assembly at high temperatures, causing an increase in optical loss and instability of the optical connection.

Therefore, there is a need for an improved method and apparatus for coupling optical fibers suitable for use in harsh environments.

SUMMARY OF THE INVENTION

Optical connector assemblies suitable for use in harsh environments such as down hole oil and gas well applications and methods for fabricating the same are provided. In one embodiment, an optical connector assembly suitable for down hole oil field applications comprises a first and second optical waveguide urged by a biasing member against a bracket. Each of the waveguides has at least one base surface formed on the exterior of the waveguide that is disposed against at least one of a plurality of reference surfaces of the bracket. In another embodiment, flats comprise two of the base surfaces on each optical waveguide.

In another embodiment, a method of fabricating an optical connector assembly suitable for down hole oil field applications includes the steps of forming a first flat on a first optical waveguide, forming a second flat on the first optical waveguide, forming a first flat on a second optical waveguide, forming a second flat on the second optical waveguide, and biasing the first flats of the first and second optical waveguides against a first seating surface and second flats of the first and second optical waveguides against a second seating surface. In this manner, the waveguides are aligned.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
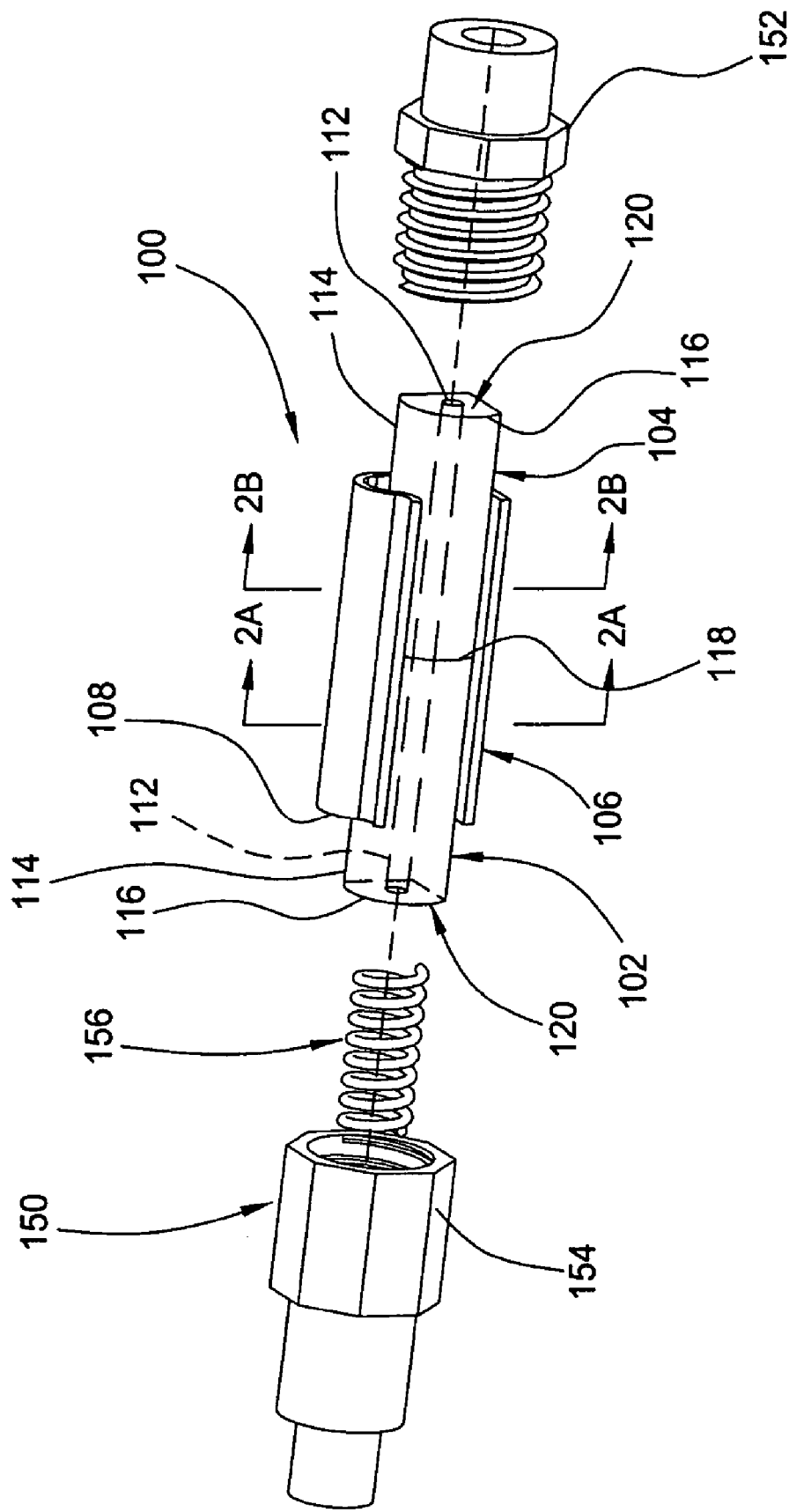
FIG. 1 is a front perspective partial exploded view of one embodiment of an optical connector assembly joining two optical waveguides suitable for use in hazardous environments.
Figure 2A:
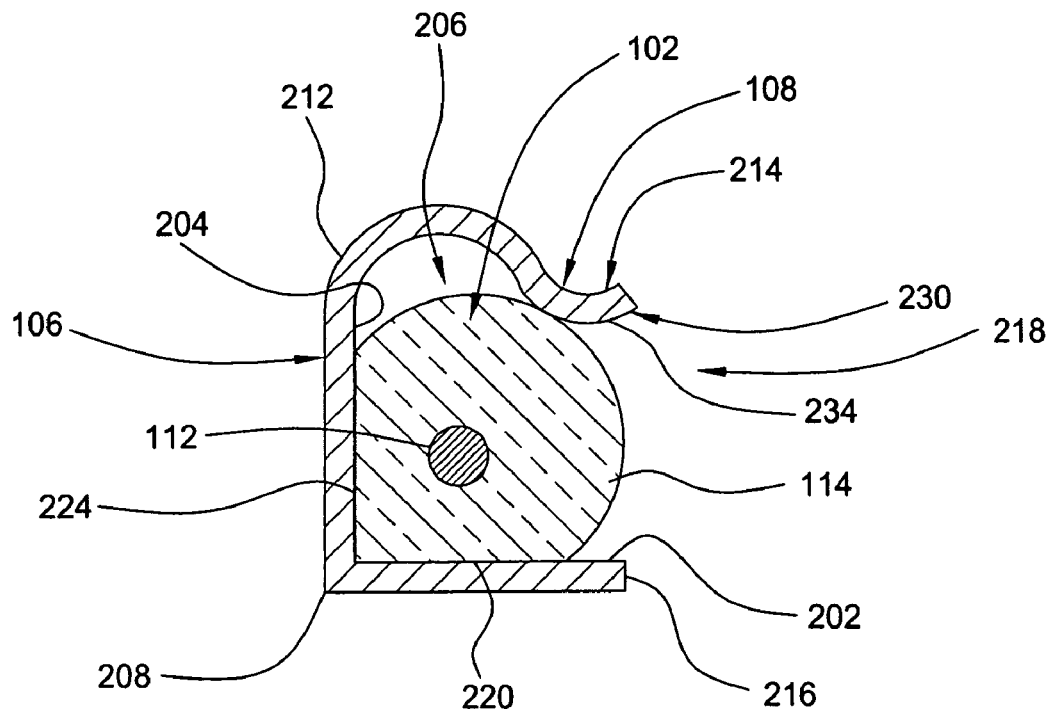
FIGS. 2A-B are cross-sectional views of the optical connector assembly of FIG. 1.
Figure 2B:
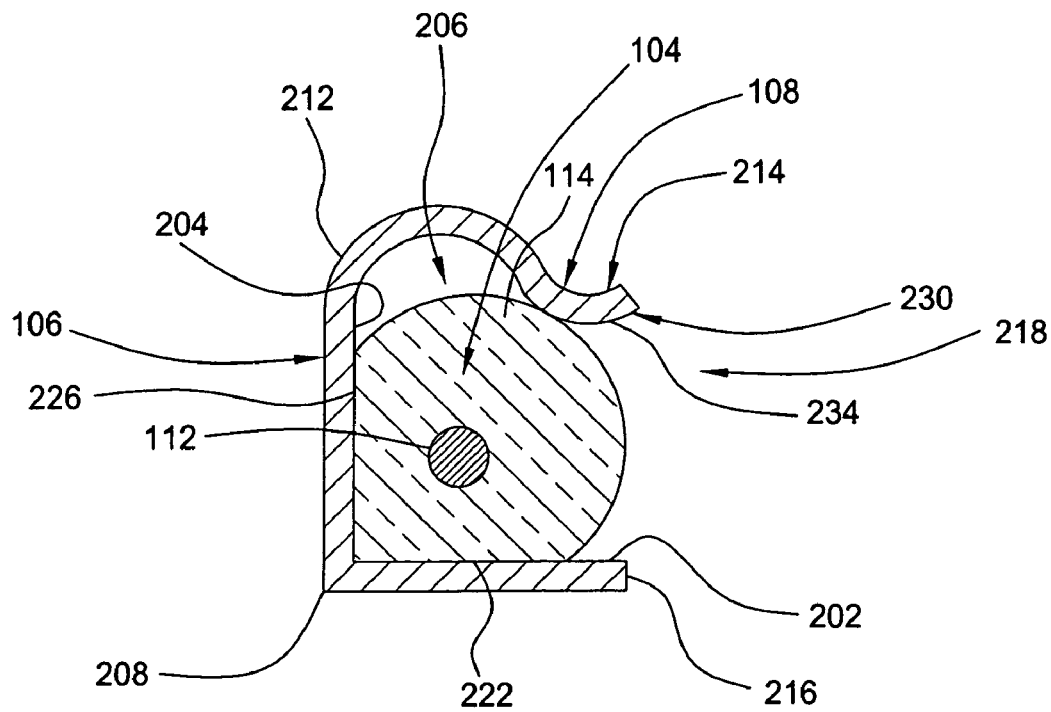

FIGS. 1 and 2A-B are front perspective partial exploded and cross-sectional views of one embodiment of an optical connector assembly 100 suitable for use in hazardous environments such as those found in oil or gas wells. The reader is encouraged to refer to FIGS. 1 and 2A-B simultaneously. The optical connector assembly 100 generally includes housing assembly 150, a bracket 106, a biasing member 108 and a pair of optical waveguides 102, 104. The waveguides 102, 104 are disposed in the bracket 106. The biasing member 108 retains the waveguides 102, 104 within the bracket 106 that is disposed in the housing assembly 150. The bracket 106 has a plurality of reference or seating surfaces against which at least one base surface of each of the waveguides 102, 104 are registered, thus holding the waveguides concentrically in a predefined position within the bracket 106.

The housing assembly 150 includes a male portion 152 that mates with a female portion 154 to house the bracket 106, biasing member 108 and waveguides 102, 104. A spring 156 is disposed in at least one of the male or female portions 152, 154 to axially load the waveguides 102, 104 as the housing assembly 150 is put together. It is contemplated that other housing assemblies may be utilized to axially load and protect the waveguides 102, 104.

The first optical waveguide 102 has at least one core 112 surrounded by a cladding 114. The materials utilized to fabricate the core 112 and the cladding 114 are selected to provide reliable transmission of optical signals through the waveguides 102, 104 when disposed in a down hole gas or oil well application. For example, the first waveguide 102 may be fabricated from a silica glass ($SiO_2$) based material having the appropriate dopants to allow light to propagate in either direction along the core 112 and/or within the cladding 114 of the first waveguide 102. The first waveguide 102 may alternatively be fabricated from other light propagating materials, for example, the first waveguide 102 may be made of any glass (e.g., silica, phosphate glass, or other glasses), plastic or other suitable material.

The cladding 114 generally has an outer dimension of at least about 0.3 mm while the core 112 has an outer dimension such that it propagates only a few spatial modes (e.g., less than about 6). For example for single spatial mode propagation, the core 112 has a substantially circular transverse cross-sectional shape with a diameter less than about 12.5 microns, depending on the wavelength of light signal traveling through the first waveguide 102. It is contemplated that larger or non-circular cores that propagate a few (less than about 6) spatial modes, in one or more transverse directions, may be utilized. The outer diameter and length of the cladding 114 are configured to resist buckling when the first waveguide 102 is placed in axial compression.

In one embodiment, the cladding 114 has an outer diameter of greater than about 400 microns (0.4 mm) which has demonstrated good buckling resistance for a waveguide length of 5 mm. It is contemplated that other waveguide diameters may be used for waveguides having different lengths. The second waveguide 104 may be similarly configured.

Mating ends 118 of the waveguides 102, 104 may be ground, polished or etched to provide good and reliable optical transmission between the waveguides 102, 104. the mating ends 118 may be square to the center line of other waveguides 102, 104 or may be orientated at an angle. In one embodiment, the ends 118 have a surface finish of about 0.006μ RA and are orientated at about 12 degrees relative to the centerline. Opposing ends 120 of the waveguides 102, 104 positioned opposite the mating ends 110 may be ground or etched to provide tapered (or beveled or angled) outer corners or edges 116. The tapered edges 116 provide a seat for each waveguide 102, 104 that facilitates mating with another part (not shown) and/or to adjust the force angles on each of the waveguides 102, 104, among other purposes. Generally, a fiber optic conductor is spliced or fused to the opposing ends 120 of the waveguides 102, 104. For example, the opposing ends 120 of the waveguides 102, 104 may be etched, turned down or ground to provide nubs (not shown) for splicing a fiber optic pigtail assembly to the waveguides 102, 104. In another embodiment, the waveguides 102, 104 may be formed by collapsing a tube around an optical fiber core.

The waveguides 102, 104 may be made using conventional glass fiber drawing techniques or later developed that provide the resultant desired dimensions for the core 112 and the cladding 114 discussed above. As such, the external surfaces of the waveguides 102, 104 will likely be optically flat. Because the waveguides 102, 104 have a large outer diameter compared to that of a standard optical fiber (e.g., 125 microns), the exterior of the cladding 114 to be ground, etched or machined while retaining the mechanical strength.

The waveguides 102, 104 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

Alternatively, the waveguides 102, 104 may be formed by heating, collapsing and fusing a glass capillary tube to a fiber (not shown), for example, by heating with a laser, filament, flame, etc. Other techniques may be used for collapsing and fusing the tubes to the fiber, such as is discussed in U.S. Pat. No. 5,745,626, entitled "Method For And Encapsulation Of An Optical Fiber", issued to Duck et al., and U.S. Pat. No. 4,915,467, entitled "Method of Making Fiber Coupler Having Integral Precision Connection Wells", issued to Berkey, both of which are incorporated herein by reference in their entireties. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

Each of the waveguides 102, 104 includes at least one registration feature or base surface that is precision fabricated using the center axis of the respective waveguide cores 112 as dimensional coordinate origin. For example, the base surface may be at least a portion of a diameter, slot, a flat or other registration feature formed on the surface of the waveguide by a precision forming process (i.e., ground, etched, machined or the like) that is formed at or defines a predetermined distance from the centerline of the waveguide. The distance of the base surface relative to the core 112 is generally less than the radius of the waveguide. The one or more base surfaces of the waveguides 102, 104 are positioned and biased against the reference surfaces of the bracket 106 by the biasing member 108 to provide concentric alignment of the waveguides 102, 104 with little or no temperature effect upon the alignment, thereby making the optical connector assembly 100 advantageous for use in down hole well applications. Moreover, as the base surfaces are fabricated using the core 112 as a point of reference, the concentricity between the core 112 and cladding 114, along with the sectional shape of the cladding 114, are eliminated as factors which often result in core misalignment in conventional designs.

In the embodiment depicted in FIGS. 2A-B, the waveguides 102, 104 each include two base surfaces in the form of flats 220, 222, 224, 226. The flats 220, 222, 224, 226 are generally smooth and in one embodiment, have a surface finish of at least about 0.15 μ RA. The first flats 220 and 224 formed on respective waveguides 102, 104 share the same dimensional attributes as referenced from the waveguide's core center. For example, the flats 220, 224 each share the same distance defined between the center of the waveguide core 112 to a point where the flat is tangential to a radius line extending from the waveguide's core center. The radial distance is generally fabricated to submicron tolerances, and in one embodiment, is within plus or minus about 0.250 microns.

The second flats 222 and 226 formed on respective waveguides 102, 104 also share the same dimensional attributes as references from the waveguide core's center. For example, the second flats 222, 226 each share the same distance defined between the center of the core 112 to a point where the flat is tangential to a radius line extending from the waveguide core's center. The radial distance defined between the tangent points on the first flats 220, 224 and the second flats 222, 226 may be the same or different. The angular orientation defined between the first flats 220, 224 and the second flats 222, 226 may be varied, but is generally chosen to interface parallel to a mating surface of the bracket 106 as further discussed below.

The bracket 106 is fabricated from a substantially rigid material suitable for down hole applications. Examples of materials suitable for fabrication of the bracket 106 include spring materials, such as spring steels, carbon steels, stainless steels, resilient plastics and the like.

The bracket 106 includes a plurality of reference or seating surfaces against which the waveguides 102, 104 are registered. In the embodiment depicted in FIGS. 2A-B, the bracket 106 includes a first seating surface 204 and a second seating surface 202. The seating surfaces 202, 204 may be planar or include one or more contact points as further described with reference to the embodiment depicted in FIG. 3.

The seating surfaces 202, 204 are configured to have an orientation parallel with a centerline of the waveguides 102, 104. The seating surfaces 202, 204 partially bound a waveguide receiving pocket 206 and are oriented relative each other at an angle selected to match the angular orientation of the flats 220, 222, 224, 226 formed in the waveguides. The angle defined between the seating surfaces 202, 204 may be varied, and generally equal to or greater than about 90 degrees. Alternatively, the seating surfaces 202, 204 may define an acute angle. In one embodiment, the seating surfaces 202, 204 are joined a bend 208 to form from a single continuous element.

The biasing member 108 also bounds a portion of the waveguide receiving pocket 206 and is adapted to maintain contact with the waveguides 102, 104 when disposed in the pocket 260, thereby biasing the waveguides 102, 104 against the seating surfaces 202, 204 of the bracket 106. The biasing member 108 is generally fabricated from a materially having sufficient memory such that when the waveguides 102, 104 are disposed in the receiving pocket 206 of the bracket 106, the biasing member 108 generates sufficient force upon the waveguides 102, 104 to maintain the waveguides 102, 104 in contact with the seating surfaces 202, 204 through the range of service temperatures expected in a predefined application. For example, one embodiment of the biasing member 108 is fabricated from a spring material, such as spring steels, carbon steels, stainless steels, resilient plastics and the like. Alternatively, other spring materials may be utilized that are suitable for use in a down hole environment.

The biasing member 108 may be fabricated as a single member with the seating surfaces 202, 204, or as a separate element. In the embodiment depicted in FIGS. 2A-B, a first end 212 of the biasing member 108 is coupled to the second seating surface 204 opposite the first seating surface 202. A second end 214 of the biasing member 108 is disposed in a spaced-apart relation to an end 216 of the first seating surface 202, defining a gap 218. The gap 218 is generally narrower than the diameter of the waveguides 102, 104 so that the biasing member 108 is flexed or displaced away from the bend 208 as the waveguides 102, 104 pass through the gap 218 and into the waveguide receiving pocket 206. Once the waveguides 102, 104 are in the waveguide receiving pocket 206, the biasing member 108 substantially returns to its normal position while remaining in contact with the waveguides 102, 104, thus urging the waveguides against the seating surfaces 202, 204 of the bracket 106.

In one embodiment, the second end 214 of the biasing member 108 includes a waveguide entry facilitating feature 230 that allows biasing member 108 to be displaced as the waveguide enters the gap 218, thereby allowing the biasing member 108 and first surface 202 to spread apart, thus allowing the waveguide to easily enter the receiving pocket 206. In the embodiment depicted in FIG. 2, the second end 214 of the biasing member 108 includes a section 234 that curves away from the first surface 202 of the bracket 106. It is contemplated that other geometric configurations, such as angled tabs, balls, or other structures may be utilized to provide a tapered entry passage for the waveguide into the receiving pocket 206.

Figure 3:
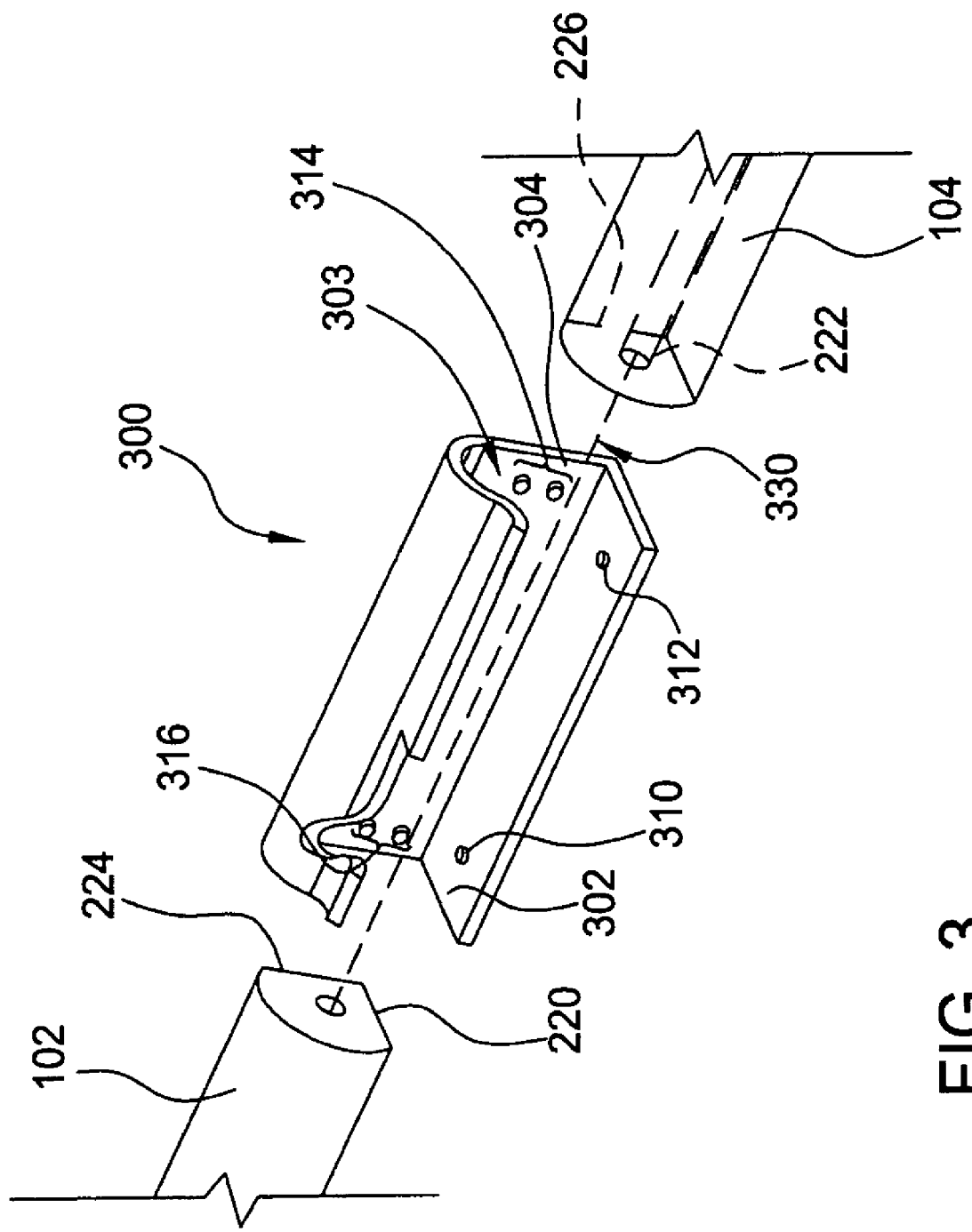
FIG. 3 a perspective view of one embodiment of a bracket.

FIG. 3 is a perspective view of another embodiment of a bracket 300 that may be utilized to couple waveguides 102, 104 (shown removed from the bracket 300 in FIG. 3). The bracket 300 is substantially similar to the bracket described above, except that seating surfaces 302, 304 of the bracket 300 include a plurality of contact members for contacting the waveguides.

In one embodiment, the first seating surface 302 includes a contact member 310 and a second contact member 312. The first and second contact members 310, 312 are disposed equidistant from a reference line 330 running through a waveguide receiving pocket 308 of the bracket 300 that is coaxial to the core centerline of the waveguides 102, 104. The contact members 310, 312 may project an equal distance inward from the first seating surface 302 and are positioned on the first seating surface 302 such that the first contact member 310 is adapted to contact the first flat of the first waveguide 102 while the second contact member 312 is adapted to contact the first flat of the second waveguide 104.

The second seating surface 304 includes plurality of contact members. In the embodiment depicted in FIG. 3, a first pair of contact members 314 and at least a second pair of contact members 316 are shown. The first and second pairs of contact members 314, 316 are disposed equidistant from the reference line 330 running through the waveguide receiving pocket 308. The contact members 314, 316 may project an equal distance inward from the second seating surface 304 and are positioned on the second seating surface 304 such that the first pair of contact members 314 is adapted to contact the second flat of the first waveguide 102 while the second pair of contact members 316 is adapted to contact the second flat of the second waveguide 104.

Generally, the contact members and pairs 312, 314, 316 and 318 are configured to minimize scratching, marring or otherwise damaging the exterior surface of the waveguides. In one embodiment, one or more of the contact members 312, 314, 316 and 318 may be dimples, ridges, posts or other projections extending from the seating surfaces 302, 304 of the bracket 300.

Referring primarily back to FIGS. 1 and 2A-B, in operation, the waveguides 102, 104 are inserted through the gap 218 into the waveguide receiving pocket 206 of the bracket 106. The waveguides 102, 104 are orientated in the bracket 106 so that the base surfaces of the waveguides 102, 104 are positioned facing the reference surfaces of the bracket 106. In one embodiment, the first flats 220, 224 of the waveguides 102, 104 are disposed against the first surface 202 of the bracket 106 while the second flats 222, 226 are disposed against the second surface 204. The biasing member 108 urges the waveguides 102, 104 against the bracket 106, the matched dimensions of the first flats 220, 224 position the centerlines of each waveguide 102, 104 at the common distance from the first surface of the bracket while the matched dimensions of the second flats 222, 226 position the centerlines of each waveguide 102, 104 at the common distance from the second surface, thereby positioning the centerlines of the waveguides 102, 104 on separate axes sharing a common plane that concentrically registers the waveguides within the bracket 106.

Figure 4:
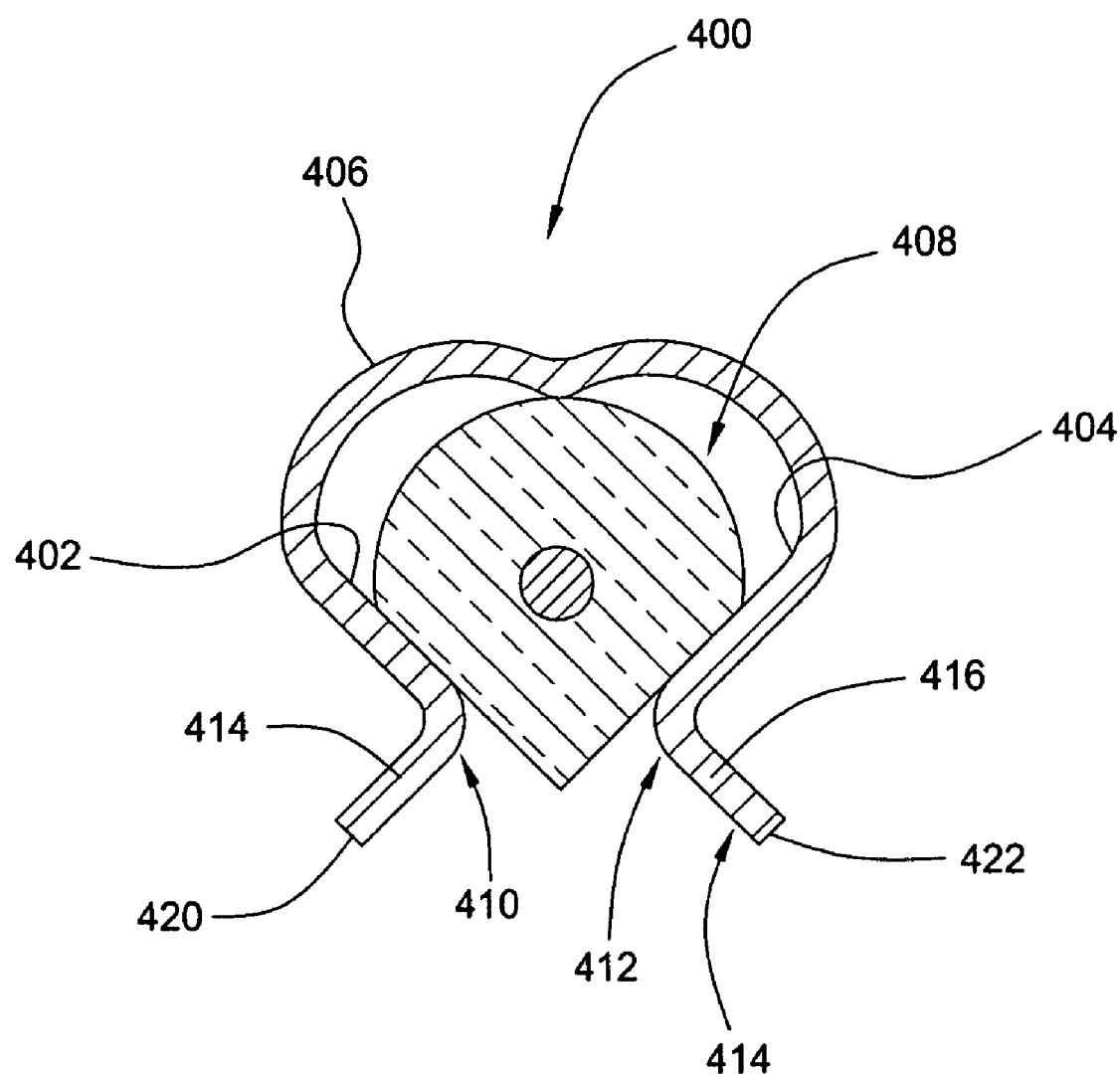
FIG. 4 is a sectional view of another embodiment of a bracket.

FIG. 4 is a sectional view of another embodiment of a bracket 400 that may be utilized to couple waveguides. The bracket 400 is substantially similar to the brackets described above, except that seating surfaces 402, 404 of the bracket 400 are coupled by a biasing member 406.

The seating surfaces 402, 404 are configured similar to the seating surfaces described above, defining a waveguide receiving pocket 408 therebetween. At least one of distal ends 410, 412 of the seating surfaces 402, 404 includes a waveguide entry facilitating feature 414 that allows the seating surfaces 402, 404 to be spread apart to allow entry of a waveguide (not shown) into the receiving pocket 408. In the embodiment depicted in FIG. 4, the distal ends 410 of the first and second seating surfaces 402, 404 includes tabs 416, 418 oriented to define an angle between about 45 and 120 degrees. The tabs 416, 418 may alternatively be curved so that ends 420, 422 of the tabs 416, 418 diverge to provide a tapered entry passage for the waveguide.

The biasing member 406 is adapted to urge the seating surfaces 402, 404 toward each other. As the seating surfaces 402, 404 urge the waveguide toward the biasing member 406, the base surfaces of the waveguides are biased against the seating surfaces 402, 404, thereby registering the centers of the waveguide cores coaxially within the bracket 400.

Figure 5:
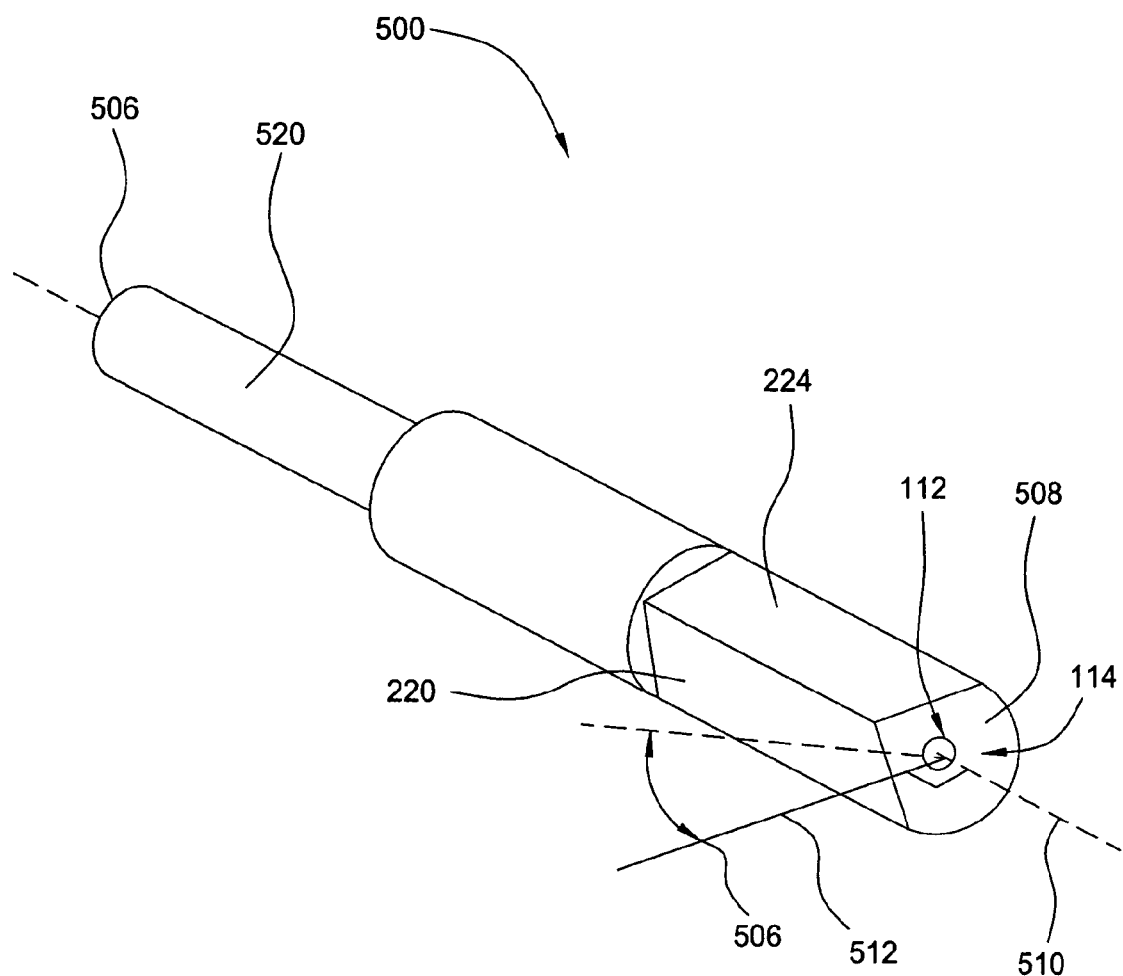
FIG. 5 is a perspective view of one embodiment of an optical waveguide.

FIG. 5 is a perspective view of one embodiment of a waveguide 500 suitable for use with the optical connector assembly 100 and bracket 106 described above. The waveguide 500 includes a core 112 suitable for optical transmission circumscribed by a cladding 114. The waveguide 500 has a first end 506 and a second end 508. The first end 506 is adapted to be coupled to an optical fiber, and in an embodiment shown in FIG. 5, includes a reduced diameter section 520 suitable for splicing.

The second end 508 is configured to mate with an end of a second waveguide (not shown). The second end 508 may be square to a center line 510 of the waveguide 500, or may be disposed at an acute angle 506 relative to a line 512 oriented perpendicular to the center line 510.

A first base surface 220 is ground or otherwise formed in the cladding 114 at a predefined distance from the core 112. A second first base surface 224 is also ground or otherwise formed in the cladding 114 at a predefined distance from the core 112. The distances between the core 112 and base surfaces 220, 224 may be the same or different, and generally are configured having a tolerance within about plus or minus 2.0 microns. The base surfaces 220, 224 may also have a surface finish of less than about 0.20 µ RA to ensure a good fit with the reference surfaces of the bracket 106.

Figure 6:
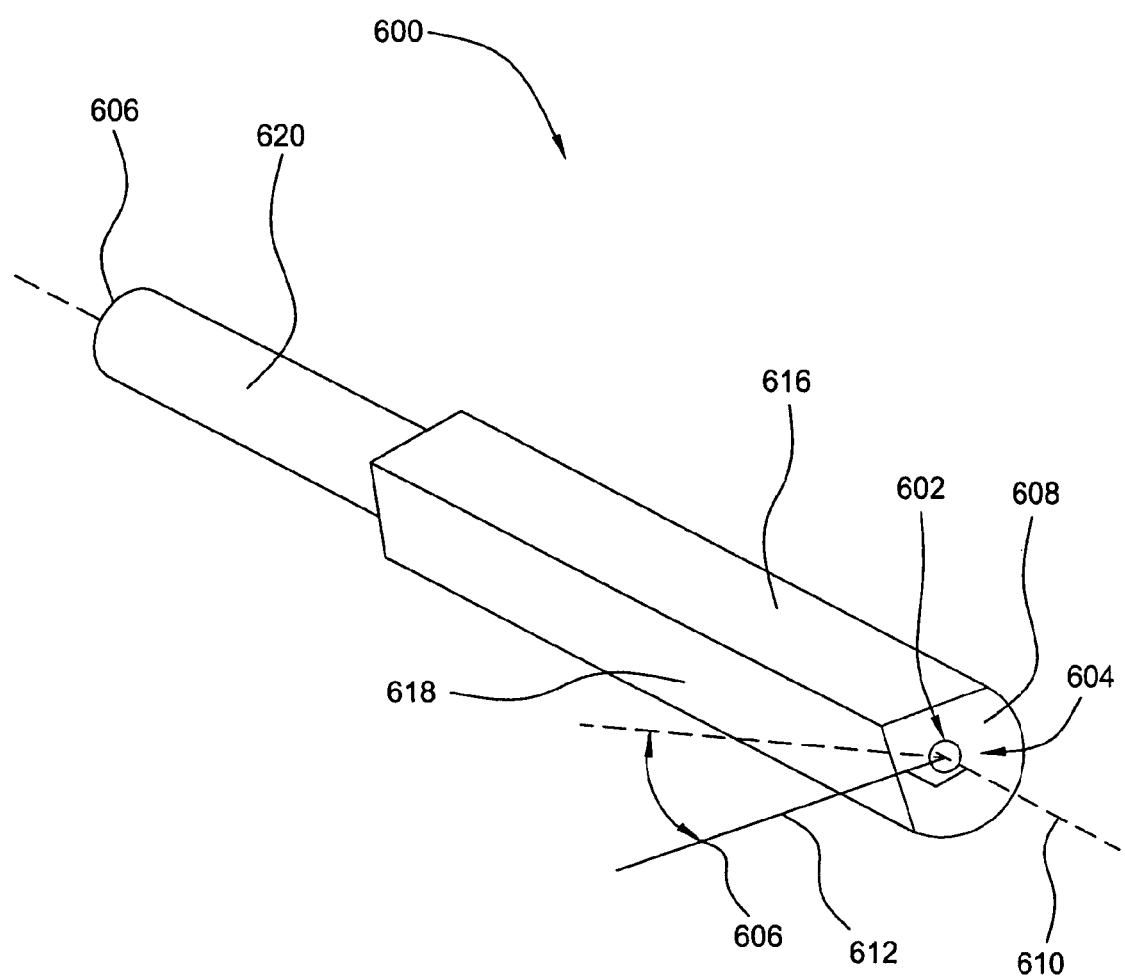
FIG. 6 is a perspective view of one embodiment of an optical waveguide.

FIG. 6 is a perspective view of one embodiment of a waveguide 600 suitable for use with another embodiment of a connector assembly 800 described with reference to FIG. 8 below. The waveguide 600 is similar to the waveguides described above, and includes a core 602 suitable for optical transmission surrounded by a cladding 604. The waveguide 600 has a first end 606 and a second end 608. The first end 606 is adapted to be coupled to an optical fiber, and in an embodiment shown in FIG. 6, includes a reduced diameter section 620 suitable for splicing.

The second end 608 is configured to mate with an end of a second waveguide (not shown). The second end 608 may be square to a center line 610 of the waveguide 600, or may be disposed at an acute angle 614 relative to a line 612 oriented perpendicular to the center line 610.

The waveguide 600 generally includes at least two registration surfaces that are utilized to orientate the core 602 in a pre-determined position to facilitate alignment of the core 602 with a core of a mating optic fiber. In the embodiment depicted in FIG. 6, the reference surfaces comprise a first flat 616 and a second flat 618 formed in the cladding 604 of the waveguide 600.

Figure 7:
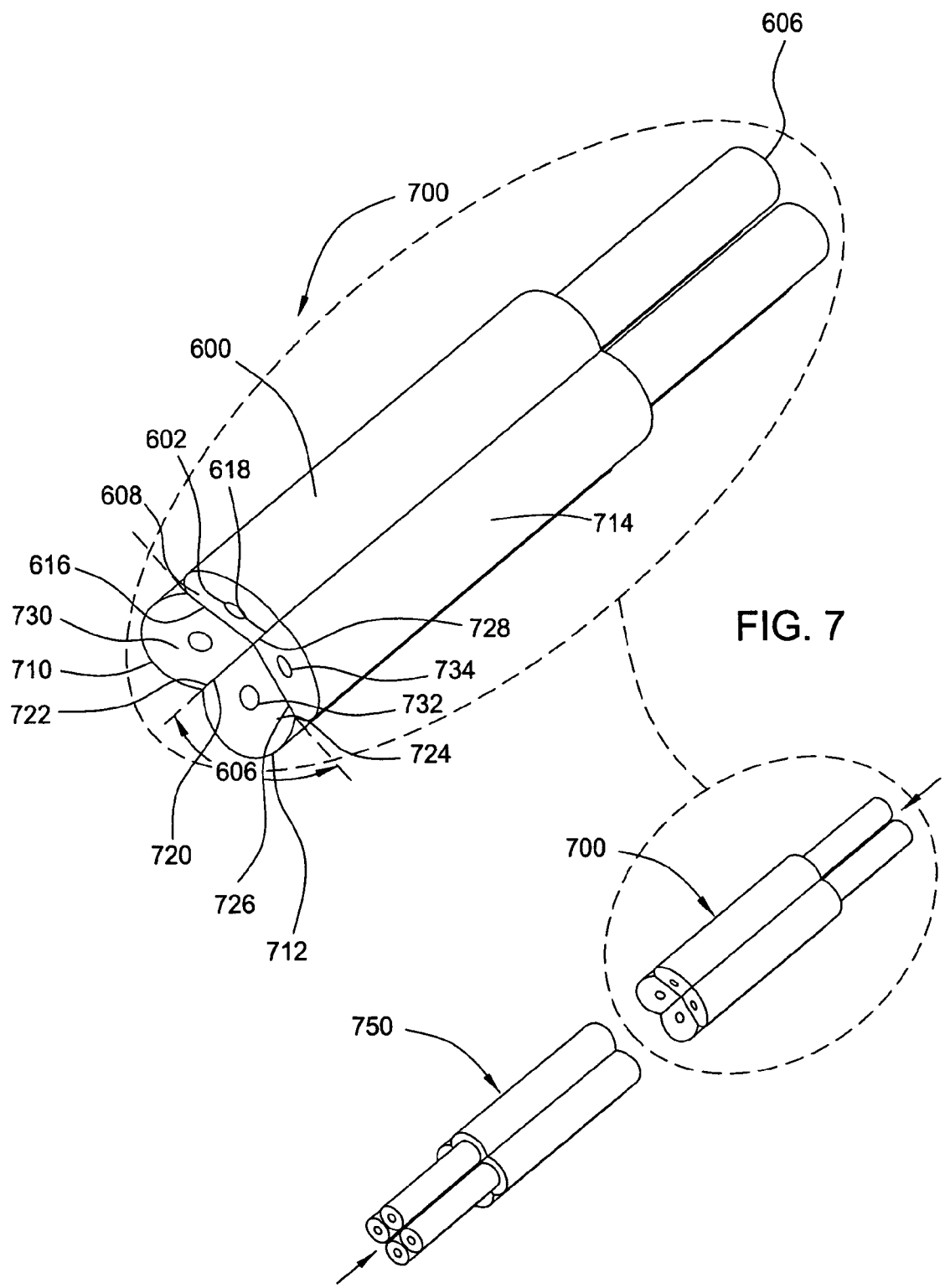
FIG. 7 is a perspective view of a bundle of optical waveguides of FIG. 5.

Referring additionally to FIG. 7, the flats 616, 618 are orientated at an angle 606 that facilitates the grouping of at least two additional wavegu ides (shown as a second, third and fourth waveguides 710, 712, 714) to form a bundle 700. The waveguides 600, 710, 712, 714 comprising the bundle 700 have substantially parallel center lines. It is contemplated that the angle 600 defined by the flats 618, 618 of the waveguide 600 may the same or different than angles defined by the flats of the waveguides 710, 712, 714. In the embodiment depicted in FIG. 7, the angle 706 of the waveguide 600 is about 90 degrees. It is contemplated that the waveguide 600 may be configured with other angles, such that the bundle 700 may be comprised of three or more waveguides.

The second through waveguides 710, 712, 714 each have respective reference surfaces 718, 720, 722, 724, 726, 728 that are formed at predefined distances relative to the cores 730, 732, 734 of the respective waveguides. In the embodiment depicted in FIG. 7, the first flat 616 is disposed against the first flat 718 of the second waveguide 710. The second flat 720 of the second waveguide 710 is positioned against the first flat 722 of the third waveguide 712. The second flat 724 of the third waveguide 712 is positioned against a first flat 726 of the fourth waveguide 714. The second flat 728 of the fourth waveguide 714 is positioned against the second flat 718 of the waveguide 600. Thus, as the waveguides 600, 710, 712, 714 are assembled into the bundle 700, the cores 602, 730, 732, 734 are positioned in a pre-defined orientation relative to each other to ensure alignment with a mating bundle 750 (shown in phantom).

Figure 8A:
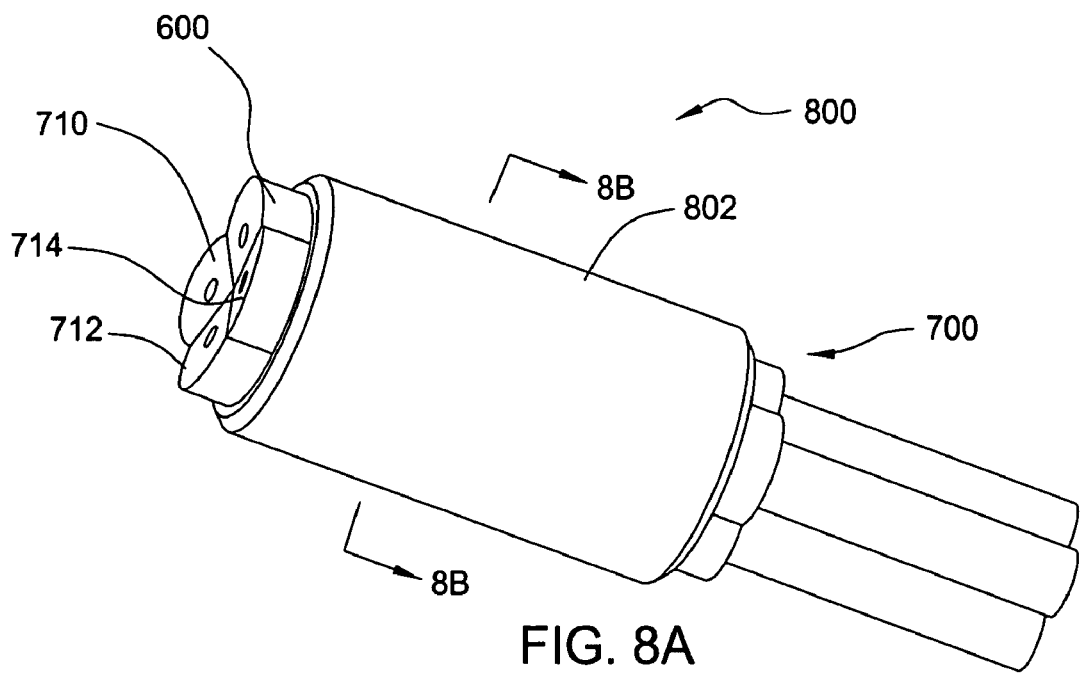
FIG. 8A is a perspective view of one embodiment of an optical connector assembly.

Referring to FIG. 8A, the bundle 700 may be retained by a bracket 802 to form a connector assembly 800. The bracket 802 generally provides a bias force that urges the reference surfaces of the waveguides 600, 710, 712, 714 against one another, thereby maintaining the cores 602, 730, 732, 734 in a predefined orientation. The bracket 802 is generally fabricated from a material compatible with a down hole oil and gas well environment, or may alternatively be fabricated from materials suitable for use in a predefined environment.

Figure 8B:
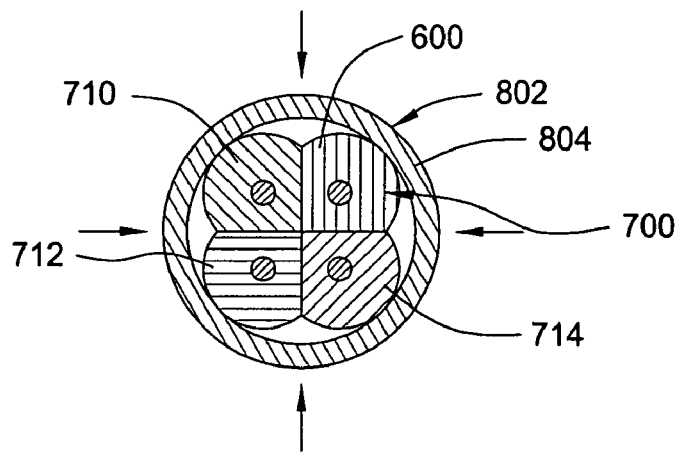
FIG. 8B is a sectional view of the connector assembly of FIG. 7A.

One embodiment of a bracket 802 is depicted in the sectional view of the connector assembly 800 depicted in FIG. 8B. The bracket 802 is shown as a sleeve 804 that radially compresses the wave guides 600, 710, 712, 714 toward the center of the sleeve 804. In one embodiment, the sleeve 804 is resilient and may be fabricated from an elastomer, heat-shrink plastic, or other material that may be temporarily expanded or enlarged to fit over the bundle 700 then shrunk or swaged there round, or other material suitable for radially biasing the waveguides 600, 710, 712, 714 toward a center of the bundle 700. In another embodiment, the embodiment, the sleeve 804 may comprise a spring. In yet another embodiment, the sleeve 804 may be a glass tube collapsed around the bundle 804. It is also contemplated that the bracket 802 may be fabricated from a rigid material and configured to fit tightly around the bundle 700 or otherwise rigidly retain the bundle 700 in a predefined orientation.

Figure 8C:
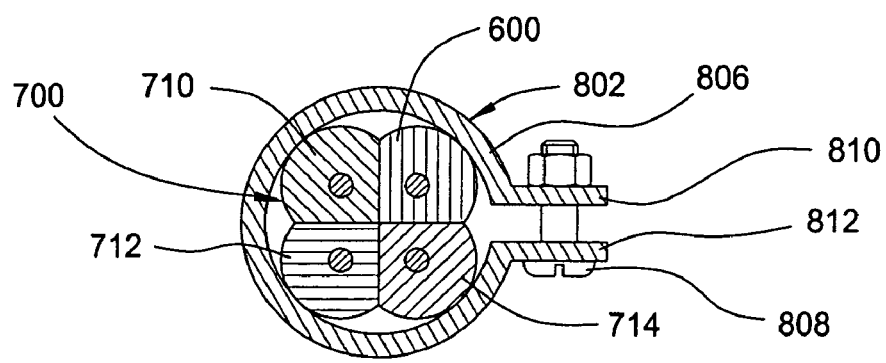
FIG. 8C is a sectional view of another embodiment of a connector assembly.

FIG. 8C depicts an alternate embodiment of a bracket 802. The bracket 802 comprises a band 806 that may be tightened or sprung around the circumference of the bundle 700, thereby compressing the waveguides 600, 710, 712, 714 together. In one embodiment, the sleeve 804 includes two tabs 810 and 812, which are urged toward each other by a fastener 808 threaded into the tab 810. The band 806 may alternatively be a spring form or clamp.

Figure 9:
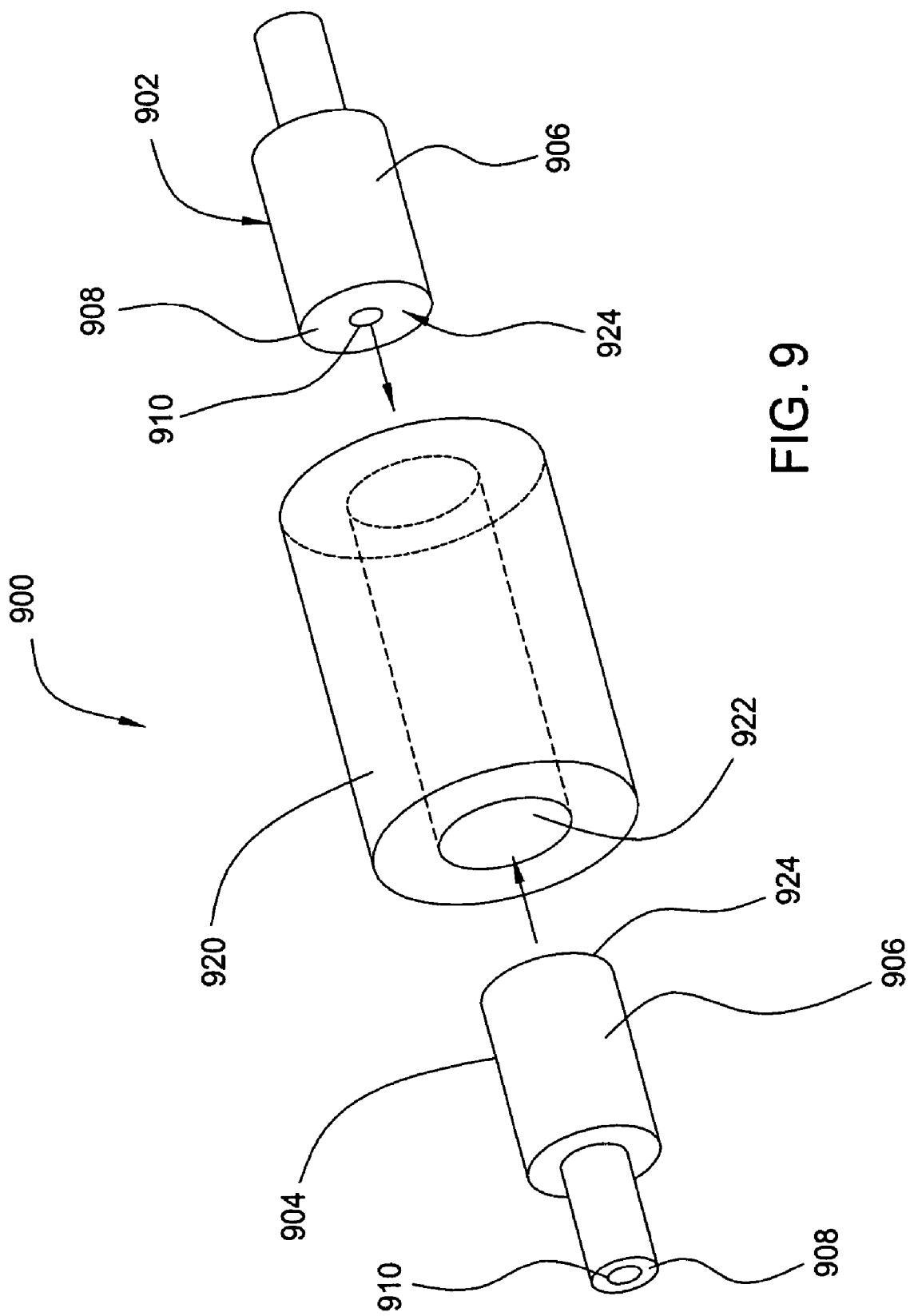
FIG. 9 is an exploded perspective view of another embodiment of a connector assembly.

FIG. 9 depicts another embodiment of a connector assembly 900 suitable for axially aligning a first optical waveguide 902 to a second optical waveguide 904. The waveguides 902, 904 are substantially similar to the waveguides described above, wherein the waveguides 902, 904 have a predefined registration surface 906 ground or otherwise formed in a cladding 908 surrounding each core 910.

In one embodiment, the registration surface 906 is a diameter ground concentric to the cores 910 of each waveguide 902, 904. The registration surface 906 generally has a diametrical tolerance within about plus or minus 2.0 microns and a surface finish of less than about 0.20 μ RA.

A sleeve 920 is disposed around the waveguides 902, 904 and configured to interface with the registration surfaces 906 to maintain axial alignment between the waveguides 902, 904. The sleeve 920 may be fabricated from a material having a coefficient of thermal expansion similar to the waveguides 902, 904. Alternatively, the sleeve 920 may be fabricated from a material that radially compresses the waveguides 902, 904.

The sleeve 920 includes a bore 922 that receives mating ends 924 of each waveguide 902, 904. In one embodiment, the bore 922 is configured to tighten the surfaces 906 to ensure axial alignment between the waveguides 902, 904. In another embodiment, the bore 922 is configured to provide interference or pressed fit between the waveguides 902, 904 and the sleeve 920. As the sleeve 920 tightly retains the waveguides 902, 904 in predefined orientation that axially aligns the cores 910, optical signals may be reliably transmitted through the connector assembly 900.

Thus, a fiber optic waveguide connector for use in harsh environments such as down hole oil and gas well applications has been provided. The novel optic cable has unique construction that advantageously minimizes fabrication costs.

Although the invention has been described and illustrated with respect to exemplary embodiments thereof, the foregoing and various other additions and omissions may be made therein and thereto without departing from the spirit and scope of the present invention.

What is claimed is:

1. An optical connector assembly comprising:
   a first optical waveguide having a core exposed to an end surface;
   a first registration feature formed in an outer diameter of the first optical waveguide at a predefined distance from the core;
   a second registration feature formed in the outer diameter of the first optical waveguide at a predefined distance from the core;
   a second optical waveguide having a core exposed to an end surface abutting the end surface of the first optical waveguide;
   a first registration feature formed in an outer diameter of the second optical waveguide at a predefined distance from the core;
   a second registration feature formed in the outer diameter of the second optical waveguide at a predefined distance from the core; and
   a bracket having the first and second optical waveguides disposed therein, the bracket having a first portion for aligning the first registration features of the first and second optical waveguides and a second portion for aligning the second registration features of the first and second optical waveguides in an orientation that aligns the cores of the optical waveguides.

2. The assembly of claim 1, wherein the first registration feature of the first optical waveguide is a flat surface having a planar orientation parallel to the core of the first optical waveguide.

3. The assembly of claim 2, wherein the second registration feature of the first optical waveguide is a flat surface having a planar orientation parallel to the axis of the first optical waveguide.

4. The assembly of claim 3, wherein the first flat surface and the second flat surface define an angle equal to or greater than about 90 degrees.

5. The assembly of claim 3, wherein the first and second flat surfaces define an angle of about 90 degrees.

6. The assembly of claim 2, wherein the first registration feature of the second optical waveguide further comprises a first flat surface having a planar orientation parallel to the core of the second optical waveguide.

7. The assembly of claim 6, wherein a distance between a tangent point on the first flat surface of the first optical waveguide and the core of the first optical waveguide is about equal to a distance between a point tangent on the first flat surface of the second optical waveguide and the core of the second optical waveguide.

8. The assembly of claim 1, wherein the first portion of the bracket has a plurality of contact features extending therefrom and contacting the first optical waveguide.

9. The assembly of claim 8, wherein at least one of the contact features is selected from the group comprising dimples, ridges or posts.

10. The assembly of claim 8, wherein the contact features further comprise:
    a first contact feature disposed against the first registration feature of the first optical waveguide;
    a second and third contact feature disposed against the second registration feature of the first optical waveguide;
    a third contact feature disposed against the first registration feature of the second optical waveguide; and
    a fourth and fifth contact feature disposed against the second registration feature of the second optical waveguide.

11. The assembly of claim 1 further comprising:
    a biasing member adapted to urge the waveguides towards the bracket.

12. The assembly of claim 11, wherein the biasing member is coupled between the first portion and the second portion of the bracket.

13. The assembly of claim 12, wherein ends of the first and second portion disposed opposite the biasing member diverge to form a waveguide entry feature.

14. The assembly of claim 11, wherein the second portion of the bracket is coupled between the first portion and the biasing member to define a waveguide receding pocket.

15. The assembly of claim 14, wherein an end of the biasing member disposed opposite the second portion of the bracket is oriented away from the second portion to defined a waveguide entry feature.

16. The assembly of claim 11, wherein the biasing member is fabricated from a spring material.

17. An optical connector assembly comprising:
 a first optical waveguide having a core exposed to an end surface;
 a first flat formed in an outer diameter of the first optical waveguide;
 a second flat formed in the outer diameter of the first optical waveguide
 a second optical waveguide having a core exposed to an end surface abutting the end surface of the first optical waveguide;
 a first flat formed in an outer diameter of the second optical waveguide;
 a second flat formed in the outer diameter of the second optical waveguide;
 a bracket having a first seating surface coupled between a second seating surface and a biasing member, wherein the biasing member is adapted to urge the first flats of the first and second optical waveguides against the first seating surface and second flats of the first and second optical waveguides against the second seating surface such that the cores of the optical waveguides align.

18. The assembly of claim 1, wherein the first registration feature of the first optical waveguide comprises a slot.

19. The assembly of claim 1, wherein the end surfaces of the first and second optical wavegu ides are perpendicular to the central axes of the cores of the first and second waveguides, respectively.

20. The assembly of claim 1, wherein the core of the first optical waveguide is circumscribed by a cladding and the first and second registration features of the first waveguide are formed in the cladding.

21. The assembly of claim 20, wherein the core of the second optical waveguide is circumscribed by a cladding and the first and second registration features of the second waveguide are formed in the cladding.

22. The assembly of claim 1, further comprising:
 a third optical waveguide having a core exposed to an end surface and at least partially disposed within the bracket;
 a first registration feature formed in an outer diameter of the third optical waveguide at a predefined distance from the core;
 a second registration feature formed in the outer diameter of the third optical waveguide at a predefined distance from the core and disposed against the second registration feature formed in the first optical waveguide;
 a fourth optical waveguide having a core exposed to an end surface abutting the end surface of the third optical waveguide and at least partially disposed within the bracket;
 a first registration feature formed in an outer diameter of the fourth optical waveguide at a predefined distance from the core; and
 a second registration feature formed in the outer diameter of the fourth optical waveguide at a predefined distance from the core and disposed against the second registration feature formed in the second optical waveguide such that the cores of the third and fourth optical waveguides are aligned.

23. The assembly of claim 17, wherein the first and second flats formed in the first optical waveguide are oriented at an angle of about 90 degrees.

24. The assembly of claim 23, wherein the first and second flats formed in the second optical waveguide are oriented at the angle.

25. The assembly of claim 17, wherein the first flats formed in the first and second waveguides are disposed at the same distance from the core of their respective waveguides.

26. The assembly of claim 17, wherein at least one of the first and second seating surfaces of the bracket further comprises a plurality of contact elements extending therefrom.

27. The assembly of claim 17, wherein the core of the first optical waveguide is circumscribed by a cladding and the first and second flats of the first waveguide are formed in the cladding.

28. The assembly of claim 27, wherein the core of the second optical waveguide is circumscribed by a cladding and the first and second flats of the second waveguide are formed in the cladding.

* * * * *